Figure 1:
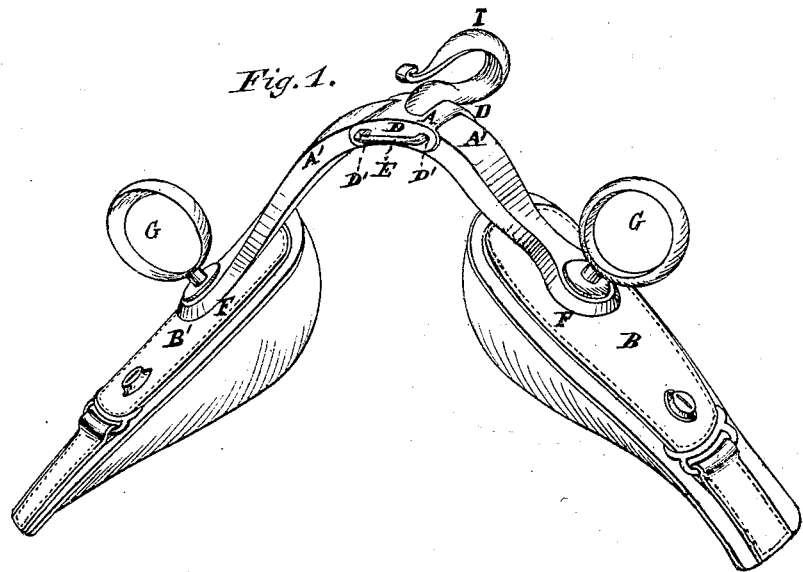

M. W. POND.
Harness-Pads.

No. 140,384.

2 Sheets--Sheet 1.

Patented July 1, 1873.

Witnesses:
R. White
J. McBride

Inventor:
Martin W. Pond
by his atty
C. W. Saladee

2 Sheets--Sheet 2.
M. W. POND.
Harness-Pads.
No. 140,384.  Patented July 1, 1873.
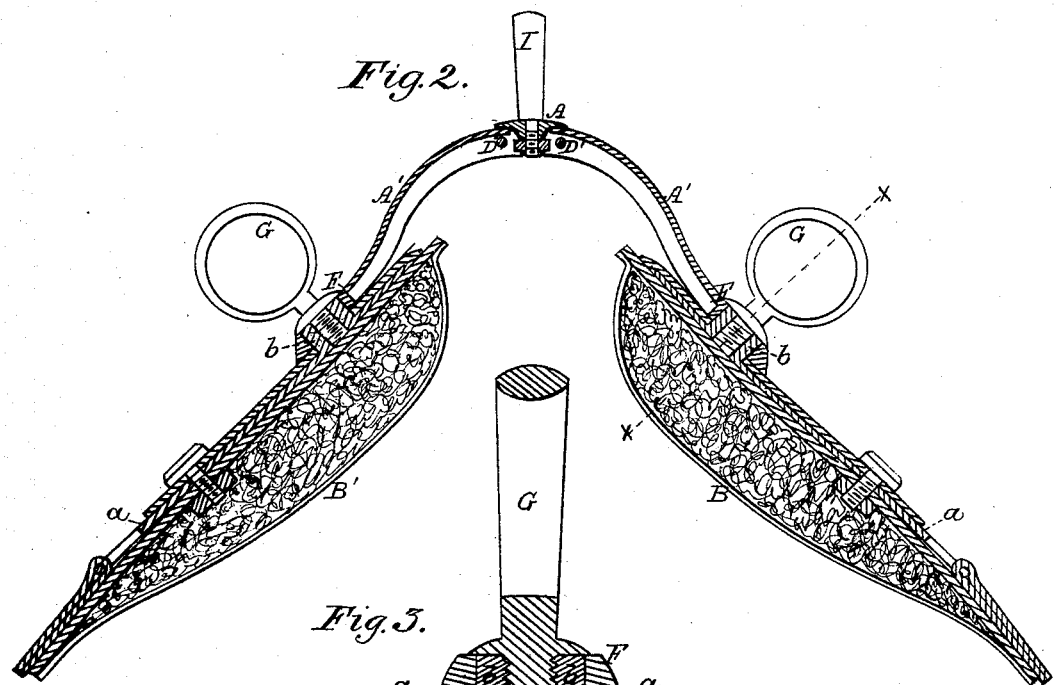
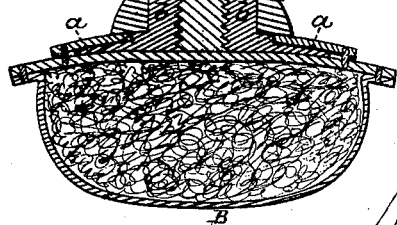
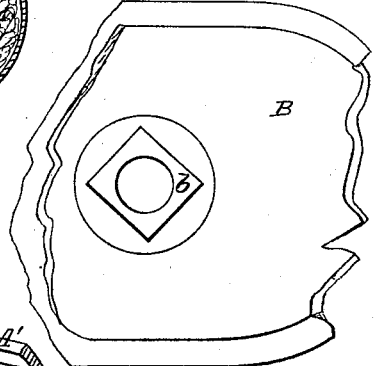
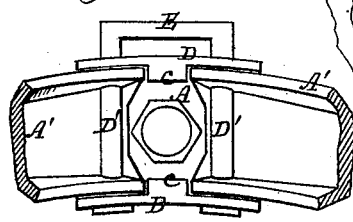
Witnesses:
J. West Wagner
Jno. D. Patten
Inventor:
Martin W. Pond
By Johnson, Klauski &c.
his Attorneys

UNITED STATES PATENT OFFICE.

MARTIN W. POND, OF ELYRIA, OHIO.

IMPROVEMENT IN HARNESS-PADS.

Specification forming part of Letters Patent No. 140,384, dated July 1, 1873; application filed December 2, 1872.

CASE A.

*To all whom it may concern:*

Be it known that I, MARTIN W. POND, of Elyria, in the county of Lorain and State of Ohio, have invented certain new and useful Improvements in Self-Adjusting Harness-Trees, of which the following is a specification:

This invention relates to what is known as the self-adjusting tree for harness-pads; and the improvement herein claimed consists of a harness-tree hinged at its center and connected rigidly to separate fulcrum-bearing pads, when such rigid connection is made by angular raised nuts from the pads and corresponding openings in the tree-arms and clamped by the terret, whereby the attachment and removal of the several fulcrum-pads is made easy and convenient while maintaining a firm connection when attached, and thereby adapt the separate fulcrum-bearing pads to a separate hinged yoke; and in the combination, in a harness-tree, of the several parts, constructed and arranged for use as hereinafter described; and in the combination of the several parts of the harness-tree, constructed and arranged for use as will be hereinafter set forth.

In the accompanying drawings, Figure 1 is a view in perspective; Fig. 2, a vertical section; Fig. 3, an enlarged cross-section at the line $x$ $x$ of Fig. 2; Fig. 4, a view of the under side of the center joint; and Fig. 5, the fastening-nut for the yoke.

The pads B B' are made separate from the yoke, from six to seven inches in length, blocked upon a proper form, and supported by a back plate, $a$, about six inches long, to obtain a leverage upon the center cap A from the fulcrum-point of the pad, which should be immediately under the terrets. The yoke is composed of two arms, A' A', the outer ends of which have a rigid fixed connection with the pad-plates $a$ by means of square nuts $b$, raised from and forming a portion of said plates and fitting into corresponding openings in the ends F of the arms A', forming a secure lock when clamped by the terret G, the screw-stem of which passes into a female screw-thread in said nut $b$, thus doing away with the adjusting-joint at that place, rendering the union firm and unyielding, and allowing the parts to be made separate and detachable. The contiguous ends of these arms A' are united by joints to a central cap-plate, A, so as to form a flexible central joint or joints between the separate pads B B' and at the crown of the yoke. These arms A' are formed with two or more flanges to render them sufficiently rigid and for securing them to the cap-flanges D, the ends of which embrace the flanges of the arms A', and through both of which a staple, D', passes to form the joints of the yoke, the said staple also forming the loop E for the back-strap.

The self-adjusting feature of the tree is by this construction transferred from the pad-plates $a$ to a central cap, A, of the yoke, which cap also serves as a means for attaching the check-hook I.

The arms A' of the yoke have a limited flexure, which is governed by means of a stop or stops, $c$ $c$, Fig. 4, formed on the inner side of the end flanges D of the cap A, upon and against which the ends of the arms A' are caused to abut, whether in the opening or closing movement of the pads B B', and also render the tree strong and firm in its use.

The pad-plates $a$ may be stiffened by ribs upon their under sides so as to resist the leverage upon the long arm of the lever in tightening the girth. In this way the pads are made self-adjusting by means of a hinged yoke.

Having described my invention, I claim—

1. In combination with a jointed yoke and separate fulcrum-pads, as described, the ends F, provided with angular projections $b$, in the manner and to obtain the advantages herein stated.

2. The harness-tree having the yoke A' A' rigidly connected to the pad-plates $a$, independent lever-pads B B', the central hinge or joint A, and the set or cut back of the yoke, the several parts being constructed and arranged for use as described.

MARTIN W. POND.

Witnesses:
F. G. POND,
R. C. KIBBY.